United States Patent Office 2,904,141
Patented Sept. 15, 1959

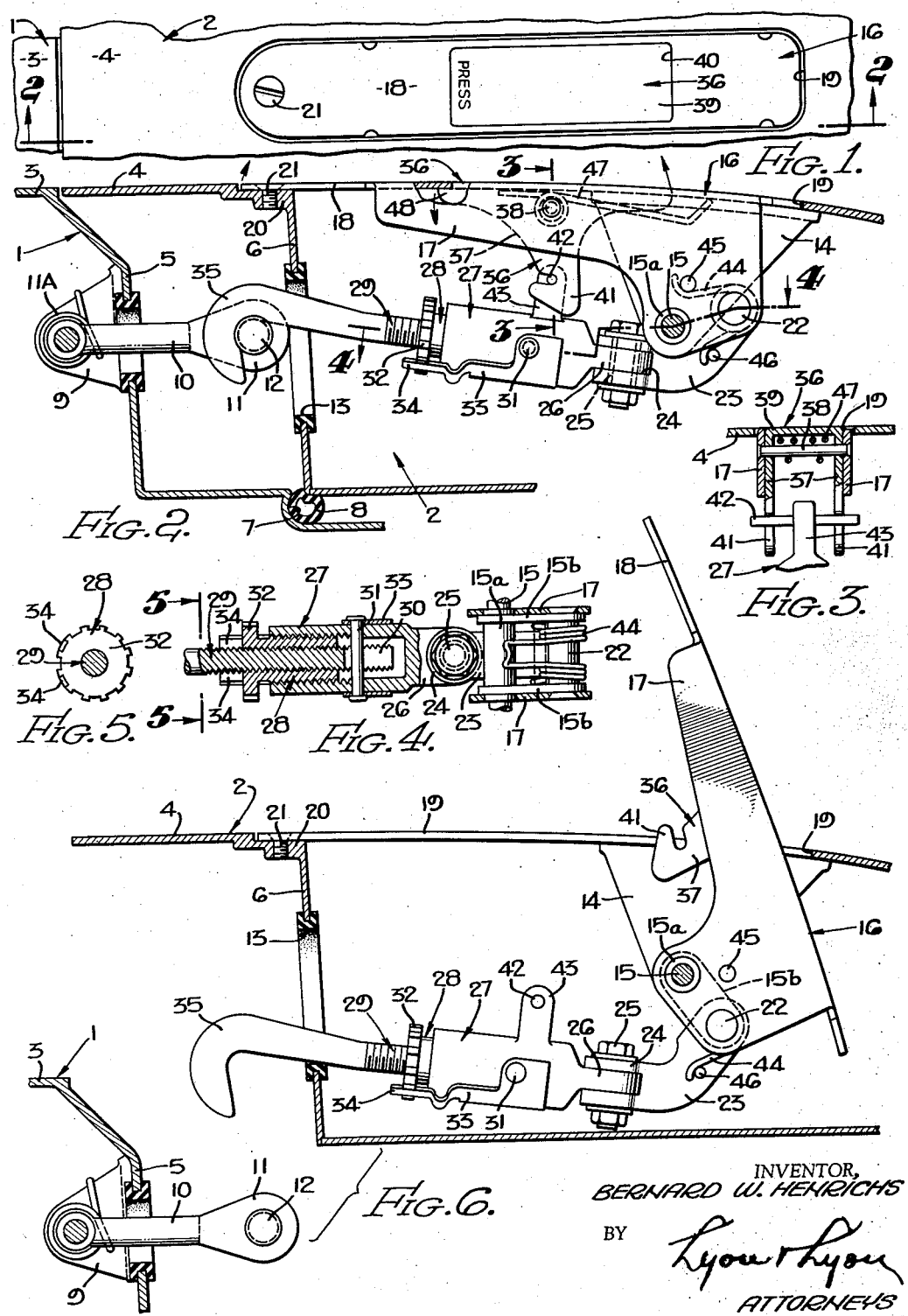

2,904,141

ADJUSTABLE HOOK LATCH

Bernard W. Henrichs, Northridge, Calif., assignor to Clark Hartwell, doing business under the fictitious name and style of Hartwell Aviation Supply Company, Los Angeles, Calif.

Application April 22, 1957, Serial No. 654,371

4 Claims. (Cl. 189—35)

This invention relates to adjustable hook latches, more particularly to hook latches intended to join major components of aircraft. Included in the objects of this invention are:

First, to provide an adjustable hook latch, the position of which is longitudinally adjustable and laterally movable to compensate for misalignment of the components joined by the latch.

Second, to provide an adjustable hook latch wherein the handle means is arranged to be mounted flush in the surrounding structure.

With the above and other objects in view, as may appear hereinafter, reference is directed to the accompanying drawings in which:

Figure 1 is a fragmentary plan view of the adjustable hook latch with the surrounding structure shown fragmentarily;

Fig. 2 is a longitudinal sectional view through 2—2 of Fig. 1 with the latch structure shown in elevation;

Fig. 3 is a transverse sectional view through 3—3 of Fig. 2;

Fig. 4 is a fragmentary sectional view through 4—4 of Fig. 2;

Fig. 5 is a sectional view through 5—5 of Fig. 4;

Fig. 6 is a sectional view taken along the same line as Fig. 2 with the latch structure shown in elevation, and showing the latch in its open condition.

The adjustable hook latch is intended to join component structures 1 and 2 which, for example, may be major components of an aircraft. The component structures have flush outer skins 3 and 4 which are joined to spaced confronting walls 5 and 6. The wall 5 is indicated as having a shoulder 7 which receives a tubular gasket 8 engageable by the wall 6. The wall 5 may support a pair of brackets 9 which in turn pivotally support a keeper shaft 10 terminating in a keeper yoke 11 having a cross pin 12. The shaft 10 and yoke 11 extend into the structure 2 through an accommodation slot 13. A spring 11a is provided to urge the yoke upwardly, as viewed in Fig. 1.

Mounted in the component structure 2 is a pair of brackets 14. The brackets are shown as attached to the skin 4, or they may be attached to or form a part of suitable framework provided within the component structure.

A main journal pin 15 is supported by the brackets 14 and is provided with a reinforcing sleeve 15a which pivotally supports a handle member 16. The handle member is channel-shaped in cross section and includes side flanges 17 connected by a web 18. The web 18 is adapted to be positioned flush within an opening 19 formed in the skin 4. One end of the opening, which accommodates the end of the web 18 remote from the pin 15, is provided with a lip 20 which receives a locking screw 21 adapted to be inserted through an aperture provided in the end of the web 18.

At the side of the journal pin 15 opposite from the lip-engaging end of the web 18, the side flanges 17 support a journal pin 22. The journal pin 22 is parallel to the main journal pin 15 and is so disposed that when the handle member 16 is pivoted about the axis of the journal pin 15, the journal pin 22 moves in an arc downward and under the journal pin 15. The journal pin reinforcing sleeve 15a is provided with reinforcing arms 15b which receive the ends of the journal pin 22.

The journal pin 15 supports a link arm 23 in the form of an elbow which extends downwardly and under the journal pin 15. The link arm 23 terminates in a yoke 24 having a horizontal slot and arranged to receive a vertically extending bolt 25. The yoke 24 receives a tongue 26 for pivotal movement about an axis transverse to the journal pin 22.

The tongue 26 is attached to a sleeve 27 which is internally screw-threaded to receive a differential screw 28. The differential screw is provided with external threads of one pitch and is provided with an internally screw-threaded bore of a different pitch. A screw-threaded rod 29 is received in the bore of the sleeve 27. By reason of the fact that the internal and external screw threads of the differential screw 28 have different pitches, the rod 29 is movable without rotation into and out of the sleeve 27 upon rotation of the screw 28. In order to prevent rotation of the rod 29, its inner end is provided with a slot 30 through which extends a cross pin 31, the extremities of which project laterally through the sleeve 27.

The extended end of the differential screw 28 is provided with a slotted flange 32. Supported by the extremities of the cross pin 31 is a catch member 33 having prongs 34 extending axially past the sleeve 27 to engage the slots in the flange 32 so that the differential screw may be secured in its various adjusted positions.

The rod 29 is joined to a hook member 35, which is proportioned to fit the keeper yoke 11 and engage its cross pin 12.

The handle member 16 is provided with an auxiliary latch 36, which is also channel-shaped in cross section, and includes side flanges 37 which fit between the side flanges 17 and which are pivotally joined thereto by a journal pin 38. The auxiliary latch 36 includes a web 39 connecting the side flanges 37.

The web 18 of the handle member 16 is provided with a slot 40 which accommodates the web 39 so that the web 39 normally occupies a position flush with the web 18. The auxiliary latch 36 is pivoted intermediate the ends of the web 39 so that one end of the web may be pressed downwardly to effect pivotal movement of the auxiliary latch.

The side flanges 37 extend downwardly toward the sleeve 27 and terminate in hook ends 41 which engage a cross pin 42 extending laterally from a boss 43 which projects upwardly from the sleeve 27.

A main latch spring 44 is wrapped about the journal pin 22, its engaging pins 45 and 46 extending between the side flanges 17 and projecting from the link arm 23, respectively. The action of the main spring is to urge the link arm 23, sleeve 27, and hook 35 in a counterclockwise direction, as viewed in Figs. 2 and 6.

An auxiliary latch spring 47 is wrapped about the journal pin 38 and is provided with ends which bear against the webs 39 and 18 to urge the web of the auxiliary latch to a position flush with the web of the handle member 16. The side flanges 37 are provided with stop lugs 48 which engage the under side of the web 18 at one end of the slot 40 to limit pivotal movement of the auxiliary latch 36.

Operation of the adjustable hook latch is as follows:

When the latch is in its secured position, as shown in Fig. 2, the latch hook engages the cross pin 12 of the keeper yoke 11 and applies tension thereto to draw the confronting walls 5 and 6 toward each other. The latch hook is connected through the differential screw assembly to the link arm 23. The pivotal axis of the link arm 23 is located above a plane passing through the axes of the main journal pin 15 and the cross pin 12 so as to occupy a "past center" position.

The handle member 16 occupies a position with its web 18 flush with the skin 4. The auxiliary latch 36 also is positioned flush with the web of the handle member, and the hook ends 41 engage the cross pin 42, holding the handle member in its flush position and holding the latch structure in its latching position.

When it is desired to release the latch hook, the auxiliary latch 36 is operated to disengage the hook ends 41 from the cross pin 42, whereupon the handle member 16 may be pivoted from the position shown in Fig. 2 to the position shown in Fig. 6. During this movement, the journal 22 moves clockwise downwardly and under the main journal pin 15 so as to move the hook latch forwardly or toward the keeper yoke 11, in order that the component structure 2 containing the latch may be swung upwardly relative to the component structure 1.

The effective length of the latching hook 35 may be adjusted by rotation of the differential screw 28; engagement of the notches in the flange 32 by the catch member 33 secures the latch hook in any adjusted position.

It should be noted that if the pitches of the internal and external screw-threads are in the same direction, that is, both being either right-hand or left-hand, the rate of progress of the latch hook will be determined by the difference in pitches. This arrangement permits fine adjustment of the position of the hook member. Such fine adjustment is not, however, always necessary. Therefore, by substituting screw-threads of different pitch direction, that is, one left-hand and the other right-hand, the travel of the latch hook will be the sum of the two pitches and the adjustment will be correspondingly coarser.

The latch structure herein shown is intended to join relatively large component structures which may have tolerance defects so that exact alignment of the latch and its keeper can be assured. However, by reason of the longitudinal adjustment of the hook latch and also the lateral displacement thereof permitted by the yoke 24, tongue 26, and bolt 25, the hook latch may be readily brought into operative relation with the keeper yoke and its pin 12.

It will be observed that the load imposed on the latch is transmitted from the brackets 14, through the reinforcing sleeve 15a and arms 15b, to the link arm 23 so that the handle lever 16 need not carry any of this load. As a consequence, the handle lever may be formed of relatively thin gage or light weight material.

It should be observed from Fig. 6 that the slotted flange 32 of the differential or adjustment screw 28 may be engaged by the end of a screw driver inserted in the slot 19 when the handle 17 is raised.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An adjustable hook latch, comprising: a pivotable handle member having a fulcrum axis near one end; a link arm pivotally connected at one of its ends to said handle member immediately beyond said fulcrum axis and extending around and past said fulcrum axis with its other end directed toward the other end of said handle member; a latching structure including a hook end for attachment to a keeper, a pivotal end joined to the extended end of said link arm and defining a pivotal axis transverse to the pivotal axis between said link arm and handle member, a screw-threaded sleeve, and a screw-threaded rod joined to the respective ends of said latching structure, and a screw member having screw threads of different pitch mating respectively with the screw threads of said sleeve and rod to effect longitudinal adjustment of said hook end, said latching structure being pivotable about its pivotable connection with said link and also about the pivotable connection between said link and handle member to properly align said hook and associated keeper, thereby to apply a tensional load on said keeper in response to pivotable movement of said handle member.

2. A flush latch structure, comprising: a handle member of channel cross section having parallel side walls and a connecting web, the connecting web being arranged to occupy a position flush with a surrounding structure; fulcrum means pivotally supporting said side walls to permit movement of said handle member between said flush position and an angular position; an elbow link arm pivotally connected between said webs at one side of said fulcrum means, for movement about an axis parallel to said fulcrum axis, and extending around and to the opposite side of said fulcrum means; a catch structure including a catch member, means for adjusting the effective length of said catch structure, and means pivotally connecting said catch structure to said elbow link about an axis in a plane traversing said fulcrum axis and the pivotal axis of said elbow link, whereby said catch member is pivotable both laterally of said handle structure and about an axis parallel to the axis of movement of said handle member.

3. A flush latch structure, comprising: a handle member of channel cross section having parallel side walls and a connecting web, the connecting web being arranged to occupy a position flush with a surrounding structure; fulcrum means pivotally supporting said side walls to permit movement of said handle member between said flush position and an angular position; an elbow link arm pivotally connected between said webs at one side of said fulcrum means, for movement about an axis parallel to said fulcrum axis, and extending around and to the opposite side of said fulcrum means; a catch structure including a sleeve member having an end pivotably connected to said elbow link about an axis disposed in a plane traversing the axes of said handle member and elbow link, a tubular differential screw member screw-threaded in said sleeve and a catch member screw-threaded in said screw member whereby on rotation of said screw member said catch member is adjusted longitudinally; said catch structure being pivotable laterally of said handle member by its pivotable connection with said elbow link and pivotable about an axis parallel to said fulcrum axis by reason of said pivotable connection between said elbow link and handle member.

4. A latch construction as set forth in claim 2, wherein: an auxiliary catch lever is pivotally connected with said handle member and wherein said catch structure is provided with an auxiliary catch element engageable with said catch lever to restrain said catch structure against pivotable movement about the axis of connection of said elbow link with said handle member, said catch element and catch lever permitting limited lateral displacement of said catch structure.

References Cited in the file of this patent

UNITED STATES PATENTS

| | | |
|---|---|---|
| 1,346,655 | Jenkins | July 13, 1920 |
| 2,622,911 | Cooper | Dec. 23, 1952 |
| 2,669,477 | Jewell | Feb. 16, 1954 |
| 2,712,955 | Andrews | July 12, 1955 |
| 2,732,238 | Dornberg | Jan. 24, 1956 |